Dec. 4, 1956 T. B. WATKINS 2,773,191

AUTOMATIC FREQUENCY CONTROL

Filed Oct. 25, 1950

INVENTOR
THOMAS BROWN WATKINS
BY [signature]
ATTORNEY

United States Patent Office 2,773,191

Patented Dec. 4, 1956

2,773,191

AUTOMATIC FREQUENCY CONTROL

Thomas Brown Watkins, London, England, assignor to The General Electric Company Limited, London, England Application October 25, 1950, Serial No. 191,981

Claims priority, application Great Britain November 2, 1949

9 Claims. (Cl. 250—36)

Figures 1, 2:
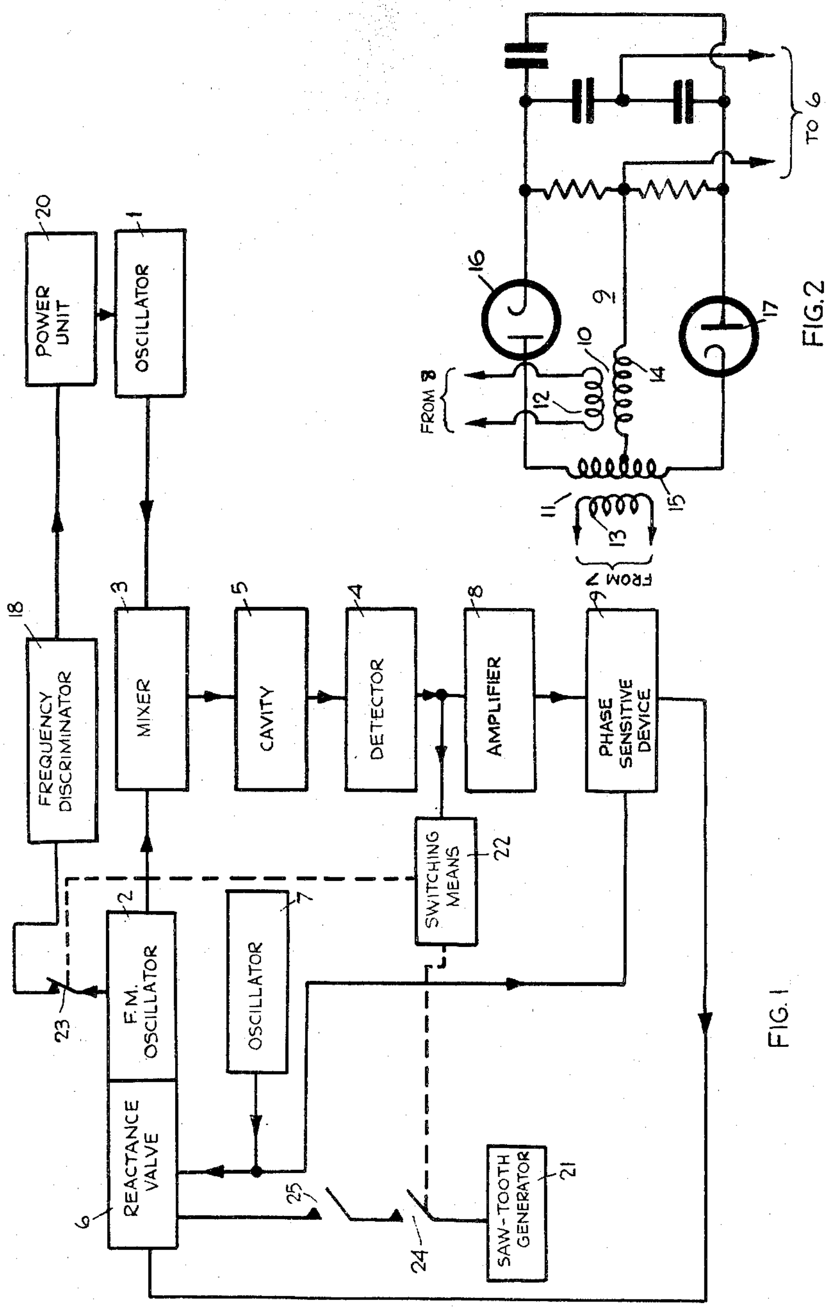

The present invention relates to electrical oscillation generators. More particularly the invention relates to generators of the kind adapted to generate electrical oscillations of very high frequencies, which in this specification, will be considered to be frequencies greater than 300 megacycles per second. Such generators are used for example in microwave radio transmitters and receivers.

One object of the present invention is to provide an electrical oscillation generator of the kind specified having novel means for controlling the frequency thereof.

According to the present invention an oscillation generator adapted to generate electrical oscillations of very high frequency comprises in combination a first electrical means adapted to generate first electrical oscillations of very high frequency, a second electrical means adapted to generate second electrical oscillations of substantially lower frequency which oscillations are frequency modulated by oscillations of a still lower frequency, a mixer to which said first oscillations and said second oscillations may be applied to provide output oscillations at a frequency or frequencies which are the sum and/or difference of the frequencies of said first oscillations and said second oscillations, detector means, band-pass filter means having a relatively narrow band width through which output oscillations from said mixer are arranged to be fed to the detector means, and frequency discriminating means supplied from the said second electrical means, the operating frequencies of the first and second electrical means being arranged to be controlled by output signals from the said discriminating means and the said detecting means in such a manner that the frequency of the first electrical oscillations is determined essentially by the said band-pass filter.

Means may be provided to interrupt or override the said control upon the first electrical means and the second electrical means may be adapted to be tuned so that the mean frequency of the second oscillations may be varied over a range of frequencies, for example by the application of a signal having a saw-tooth wave form to a reactance valve associated with an oscillator. Thus, when setting up the oscillation generator, the control upon the operating frequency of the first electrical means may be temporarily removed and the second electrical means then tuned until the output oscillations from the mixer will pass through the band-pass filter means. There will then be an output from the detector means which is capable of controlling the frequency of the second electrical means and the aforesaid means to interrupt or override the control upon the first electrical means may then be operated to restore the automatic control of the frequency of the first electrical oscillations.

Preferably the first and second electrical means may each be an oscillator.

One arrangement of an oscillation generator according to the present invention will now be described by way of example with reference to the two figures of the accompanying diagrammatic drawing in which Figure 1 shows a block diagram of the oscillation generator and Figure 2 shows the circuit of a part of the generator.

Referring now to Figure 1, the oscillation generator comprises a first oscillator 1 of the velocity-modulated type which is adapted to generate oscillations of very high frequency and a second oscillator 2 adapted to generate oscillations of substantially lower frequency. The outputs of the oscillators 1 and 2 are applied to a frequency changing device or mixer 3, the output of which includes oscillations of a frequency equal to the difference of the frequencies of the oscillations generated by the oscillators 1 and 2. This output oscillation is fed to a crystal detector 4 through a cavity resonator 5 which acts, in effect, as a band-pass filter. The cavity resonator 5 has a relatively narrow band width.

The oscillator 2 is adapted to be modulated at a relatively low frequency and this modulation is present in the output oscillations from the mixer 3. For this purpose, a reactance valve 6 is associated in known manner with the oscillator 2 and the reactance valve 6 is supplied with oscillations by an oscillator 7. The cavity 5 and the detector 4 act as a frequency discriminator and when the difference of the frequencies of the oscillations generated by the oscillators 1 and 2 is equal to the resonant frequency of the cavity 5, there will be no output signal at the modulation frequency from the crystal detector 4. When, however, this difference does not equal the resonant frequency of the cavity 5, the crystal detector 4 will provide a signal at the said modulation frequency the phase of which will be dependent on whether the said difference is less or more than the resonant frequency of the cavity 5. The signal from the crystal detector 4 is passed through an amplifier 8 to a phase-sensitive device 9 which compares the phase of the modulation oscillations supplied from the oscillator 7 with those obtained from the amplifier 8.

Referring now to Figure 2, the phase sensitive device 9 comprises two transformers 10 and 11 to the primary winding 12 and 13 of which are fed the signals to be compared. The sum and difference of the outputs from the secondary windings 14 and 15 of these two transformers 10 and 11 are fed respectively to two half-wave rectifiers which are formed by two diode valves 16 and 17. The difference in the outputs from these rectifiers is fed to the reactance valve 6 and is a measure of the phase difference. Thus when the input oscillations are in phase the output is a maximum and when they are in quadrature the output is zero. The sense of the output, and thus of the control on the oscillator 2, depends on whether the oscillations from the amplifier 8 are leading or lagging on those from the oscillator 7. There is however no output when the said frequency difference equals the cavity frequency since there are then no modulation oscillations passed by the amplifier 8.

Referring again to Figure 1, part of the output of the oscillator 2 is fed to a frequency discriminator 18 and the signal derived from this discriminator 18 is utilised to control the operating frequency of the velocity-modulated oscillator 1 by varying the screen or anode voltage thereof which is supplied by a power unit 20.

Thus, if the difference of the frequencies of the oscillations generated by the oscillators 1 and 2 is not equal to the resonant frequency of the cavity 5, a signal will be derived from the phase-sensitive device 9 to cause the mean frequency of operation of the oscillator 2 to be changed. If now the oscillator 2 had previously been operating at the frequency to which the frequency discriminator 18 is tuned, this change of operating frequency would produce an output signal from the frequency discriminator which, in turn, would vary the operating frequency of the oscillator 1, and the operating frequency of the oscillator 1 is arranged to be varied thereby in the correct sense to reduce the said frequency difference. It will be appreciated that, under steady conditions, the oscillator 1 will operate at a frequency substantially equal to the resonant frequency of the cavity 5 plus the frequency of the oscillator 2 while the oscillator 2 will operate at a frequency substantially equal to the frequency to which the frequency discriminator 18 is tuned. The frequency of the oscillator 2 is, however, substantially less than the resonant frequency of the cavity 5 so that the operating frequency of the oscillator 1 is determined essentially by the resonant frequency of said cavity 5.

The oscillator 2 is arranged to be tuned over a range of operating frequencies by the application of a signal having a 50 cycle per second saw-tooth wave-form produced by a generator 21. The circuit between the oscillator 2 and the frequency discriminator 18 is arranged to be broken, shown diagrammatically by the contacts 23, under the control of switching means 22 operated by the unidirectional signal arranged to be produced by the crystal detector 4 so that the frequency discriminator 18 is disconnected from the oscillator 2 when there is no such unidirectional signal, for example when first setting up the oscillation generator. The switching means 22 is also arranged to break the circuit between the generator 21 and the oscillator 2, as shown diagrammatically by the contacts 24, when there is an output from the detector 4. A hand-operated switch 25 is connected in series with the contacts 24. Thus, when setting up the oscillation generator, the contacts 23 are open, the contacts 24 are closed and the switch 25 is open. The switch 25 is then closed by hand and the oscillator 2 is tuned automatically, under the control of the signal from the generator 21, until the difference of its operating frequency and the frequency of the oscillations generated by the oscillator 1 is sufficiently close to the resonant frequency of the cavity 5 for a signal to be passed to the crystal detector 4. The oscillation generator is then in a condition for the frequency of operation of the oscillator 1 to be controlled as previously described to bring it to the desired value. The changeover is effected automatically by the switching means 22 which causes the discriminator 18 to be supplied from the oscillator 2 and which simultaneously breaks the circuit from the generator 21, whereupon the frequency of operation of the oscillator 1 is varied until its frequency less the frequency of operation of the oscillator 2 is substantially equal to the resonant frequency of the cavity 5.

In one arrangement in accordance with the invention the oscillator 1 is required to operate at a frequency of approximately 4,500 megacycles per second and is tunable between 4,400 and 4,830 megacycles per second, the operating frequency of the oscillator 2 is variable about 30 megacycles per second, the discriminator 18 being tuned to that frequency, and the oscillations generated by the oscillator 2 are frequency modulated at a frequency of 100 kilocycles per second by oscillations supplied by the oscillator 7. In this example the resonant frequency of the cavity is 4,470 megacycles per second and has a band width of 200 kilocycles per second.

With the generator described above, the relatively close control of frequency that is possible by using a resonant cavity is effected without the necessity of adapting the oscillator 1 for frequency modulation of the very high frequency oscillations generated by that oscillator.

The temperature stability of the arrangement may also be improved by arranging so that the temperature coefficient of the discriminator 18 compensates for that of the resonant cavity 5.

I claim:

1. An oscillation generator for generating electrical oscillations of very high frequency comprising a first electrical means to generate first electrical oscillations of very high frequency, a second electrical means to generate second electrical oscillations of substantially lower frequency which oscillations are frequency modulated at still lower frequency, a mixer, circuit means connecting said first and second electrical means to said mixer, detector means, band-pass filter means having a relatively narrow band width through which output oscillations from said mixer are fed to the detector means, frequency discriminating means supplied from the said second electrical means, means responsive to the output signal from said detector means to control the mean operating frequency of the second electrical means, and means responsive to the output signal from said frequency discriminator means to control the operating frequency of the first electrical means so that the frequency of the first electrical oscillations is determined essentially by the mid-band frequency of said band-pass filter.

2. An oscillation generator according to claim 1 including means responsive to a signal through the band-pass filter means, means operable by a signal supplied by the last-mentioned means to complete the said control of the first electrical means only when there is a signal through the band-pass filter means, and further means to control the second electrical means to cause the mean frequency of the second electrical oscillations to be tuned over a range of frequencies.

3. An oscillation generator for generating electrical oscillations of very high frequency comprising a first oscillator to generate first electrical oscillations of very high frequency, a second oscillator to generate second electrical oscillations of substantially lower frequency which oscillations are frequency modulated by oscillations of a still lower frequency, a mixer, circuit means connecting said first and second oscillators to said mixer, band-pass filter means having a relatively narrow bandwidth, circuit means to supply oscillations at a frequency which is the difference of the frequencies of said first oscillations and said second oscillations from said mixer to said band-pass filter means, detector means, circuit means connecting said band-pass filter means to said detector means, frequency discriminating means supplied from the said second oscillator, means responsive to the output signal from said detector means to control the mean operating frequency of the second oscillator, and means responsive to the output signal from said frequency discriminating means to control the operating frequency of the first oscillator so that the frequency of the first electrical oscillations is determined essentially by the mid-band frequency of said band-pass filter.

4. An oscillation generator according to claim 3 wherein the second oscillator is a frequency-modulation oscillator and means are provided to supply modulation oscillations to that oscillator.

5. An oscillation generator according to claim 4 also including means responsive to a signal through the band-pass filter means, means operable by a signal supplied by the last-mentioned means to complete the said control of the first oscillator only when there is a signal through the band-pass filter means, an electric waveform generator, a circuit to supply a signal from said waveform generator to the second oscillator to cause the mean frequency of the second oscillations to be tuned over a range of frequencies, and means operable by a signal supplied by the said means responsive to a signal through the band-pass filter means to complete the said circuit only when there is no signal through the band-pass filter means.

6. An oscillation generator according to claim 5 wherein the said waveform generator is a saw-tooth generator.

7. An oscillation generator according to claim 3 wherein the said means to control the mean operating frequency of the second oscillator includes a phase sensitive device to compare the phases of the output signal from the detector means and the said modulation oscillation.

8. An oscillation generator for generating electrical oscillations of very high frequency comprising a first oscillator adapted to generate first electrical oscillations of very high frequency, a second frequency-modulation oscillator adapted to generate second electrical oscillations of substantially lower frequency, a further oscillator to supply oscillations to the second oscillator to frequency modulate the second oscillations, a mixer to which are applied said first oscillations and said second oscillations to provide output oscillations at a frequency which is the difference of the frequencies of said first oscillations and said second oscillations, detector means, a resonant cavity through which output oscillations from said mixer are fed to the detector means, a phase sensitive device to compare the phases of the output signal from the detector means and oscillations supplied by said further oscillator, frequency discriminating means supplied from the second oscillator, means responsive to the output signal from said phase sensitive device to control the mean operating frequency of the second oscillator, and means responsive to the output signal from said frequency discriminating means to control the operating frequency of the first oscillator.

9. An oscillation generator according to claim 8 including means responsive to a signal through the resonant cavity, means operable by a signal supplied by the last-mentioned means to complete the said control of the first oscillator only when there is a signal through the resonant cavity, an electric saw-tooth generator, a circuit to supply a signal from said saw-tooth generator to the second oscillator to cause the mean frequency of the second oscillations to be tuned over a range of frequencies, and means operable by a signal supplied by the said means responsive to a signal through the resonator cavity to complete the said circuit only when there is no signal through the resonant cavity.

References Cited in the file of this patent

UNITED STATES PATENTS

| | | |
|---|---|---|
| 2,377,327 | Seeley | June 5, 1945 |
| 2,424,833 | Korman | July 29, 1947 |
| 2,474,278 | Ranger | June 28, 1949 |
| 2,510,095 | Frankel | June 6, 1950 |
| 2,558,100 | Rambo | June 26, 1951 |
| 2,560,365 | Norton | July 10, 1951 |
| 2,564,005 | Halpern et al. | Aug. 14, 1951 |
| 2,594,263 | Munster | Apr. 22, 1952 |
| 2,631,269 | Norton | Mar. 10, 1953 |
| 2,640,156 | Schultz | May 26, 1953 |